No. 771,603. PATENTED OCT. 4, 1904.
G. A. BIRCH.
SNOW SCRAPER.
APPLICATION FILED MAR. 1, 1904.
NO MODEL.
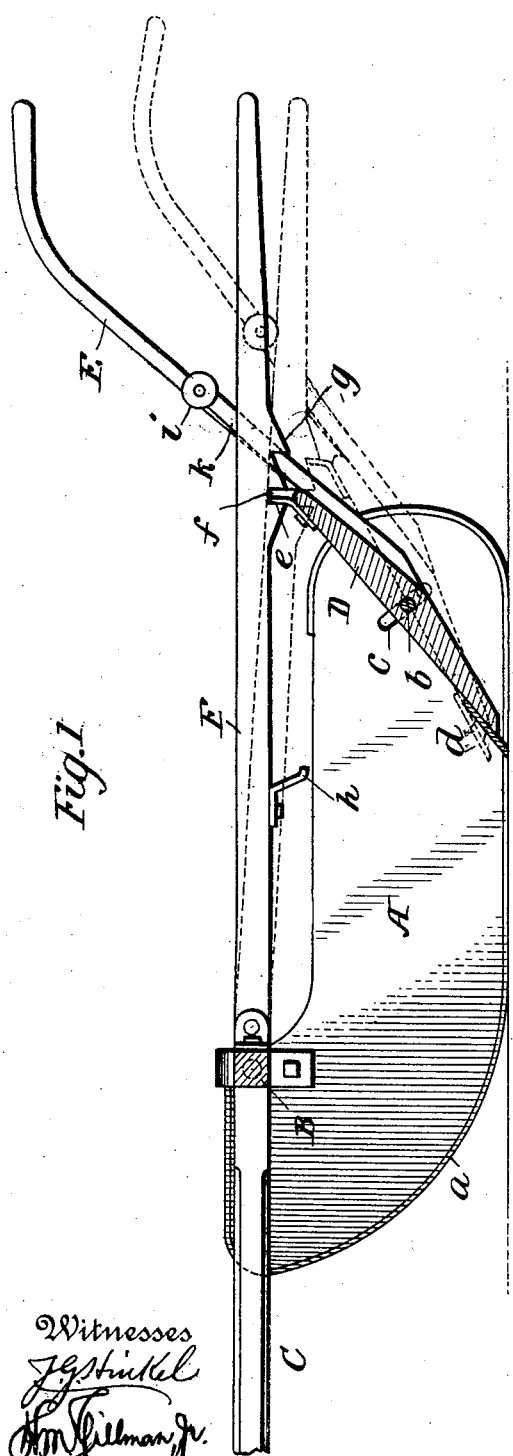
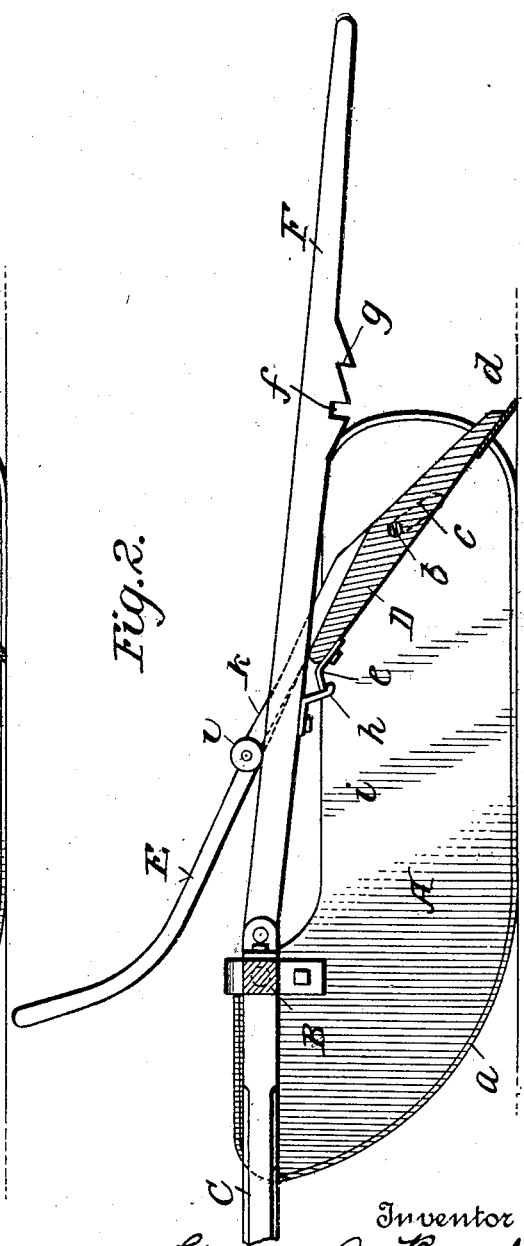
Witnesses
Inventor
George A. Birch
Attorneys No. 771,603. Patented October 4, 1904.

UNITED STATES PATENT OFFICE.

GEORGE A. BIRCH, OF RENSSELAER, NEW YORK.

SNOW-SCRAPER.

SPECIFICATION forming part of Letters Patent No. 771,603, dated October 4, 1904.

Application filed March 1, 1904. Serial No. 196,070. (No model.)

*To all whom it may concern:*

Be it known that I, GEORGE A. BIRCH, a citizen of the United States, residing at Rensselaer, in the county of Rensselaer and State of New York, have invented certain new and useful Improvements in Snow-Scrapers, of which the following is a specification.

My invention relates to snow-scrapers; and it consists of a scraper provided with a pivoted wing carrying a scraper plate or bar and means for holding the said wing in different positions, as fully set forth hereinafter and as illustrated in the accompanying drawings, in which—

Figure 1 is a longitudinal sectional elevation of a snow-scraper embodying my improvement; Fig. 2, the same, showing the parts in a different position.

The body of the scraper consists of the side pieces or runners A A, connected at the front by the cross-piece B, to which may be secured the pole or shafts C, the edges of the runners being shod with iron strips $a$.

Between the runners at the rear is placed the holder or wing D, having trunnions $b$ at the ends near the center, which trunnions extend into slots $c$ in the runners, the said slots inclined forward toward their upper ends. At the lower edge of the wing is the scraper-plate $d$ of usual construction, and to the wing are secured handles E, one or more, by means of which the apparatus may be guided.

It is necessary when scraping the ice to maintain the wing in the position shown in Fig. 1, and for this purpose it is provided with a lip $e$, adapted to engage a notch $f$ in a lever F, pivoted to the bar B and extending to the rear over the wing, as shown, the wing in such case being prevented from changing its position without the exertion of any force by the driver.

When it is desired to drag the machine along the ice without scraping, the lever F may be raised and the handle or handles E carried down until the lip $e$ engages a shoulder $g$ of the lever F, which will hold the scraper above the lower edges of the runners sufficiently to prevent any scraping effect.

When it is desired to dump the load, it is only necessary to drive forward and then lift the lever F, when the engagement of the scraper with the ice will cause the wing to turn, carrying the scraper backward beneath the pivot. If the wing was permitted to turn completely around to horizontal position, the loose scrapings between the runners would be deposited in a heap, and the apparatus which follows that, the contents of which have been dumped, would have to drive through a mass of loose snow or scrapings, and in order to prevent this I provide means whereby the wing D can be turned only to an extent approximating that indicated by dotted lines, Fig. 1 and in Fig. 2, that will present the scraper-blade in a backward inclined position to the loose mass and with the wing will condense and carry forward the loose material and spread it in a thin flat uniform layer that will not interfere with the free passage of the following apparatus. One means of securing this result consists in providing the lever F with a stop $h$, with which the lip $e$ will make contact when the top of the wing swings forward, thereby holding it in place.

To prevent the lever F from being lifted out of entire engagement with the wing, I provide the latter with arms K K, extending on opposite sides of the lever and supporting a cross-piece or roller $i$ sufficiently above the lever to permit the lever to be raised to remove the stops from contact with the wing, but with which the lever may make contact when it is desired to raise the upper end of the wing to restore the parts to working position.

While I have shown the lever F with its stops or shoulders as a means for locking the wing in different position, it will be evident that other locking means may be employed, and it will be seen that when so locked in any of its positions no exertion on the part of the driver is required to maintain the wing in place.

When the wing has taken the position shown in Fig. 2, it may be restored by means of the handle E.

Without limiting myself to the precise construction and arrangement of parts shown, I claim as my invention—

1. The combination in a snow-scraper, of side runners, a pivoted wing carrying a scraper, and means for locking the wing with its lower end inclined forward in a scraping position, or with the lower end inclined backward to depress and compress the scrapings, substantially as and for the purpose set forth.

2. The combination in a snow-scraper, of side runners, a wing pivoted between the same and carrying a scraper-blade, and means for locking the wing with the scraper-blade inclined forward and below the runners and also in a position inclined forward and above the lower edges of the runners, and also in a backwardly-inclined position, substantially as and for the purpose set forth.

3. The combination in a snow-scraper, of the side runners, pivoted wing carrying a scraper-blade, and a lever F having shoulders arranged to engage a lip at the top of the wing to hold the latter in different positions, substantially as set forth.

4. The combination in a snow-scraper, of the side runners, pivoted wing carrying a scraper-blade, a lever F having shoulders arranged to engage a lip at the top of the wing to hold the latter in different positions, and handles E extending from the wing, substantially as set forth.

In testimony whereof I have signed my name to this specification in the presence of two subscribing witnesses.

G. A. BIRCH.

Witnesses:
　CHARLES E. FOSTER,
　HUGH M. STERLING.